Feb. 21, 1961 H. WROE 2,972,695
STABILISATION OF LOW PRESSURE D.C. ARC DISCHARGES
Filed May 20, 1958 3 Sheets-Sheet 1
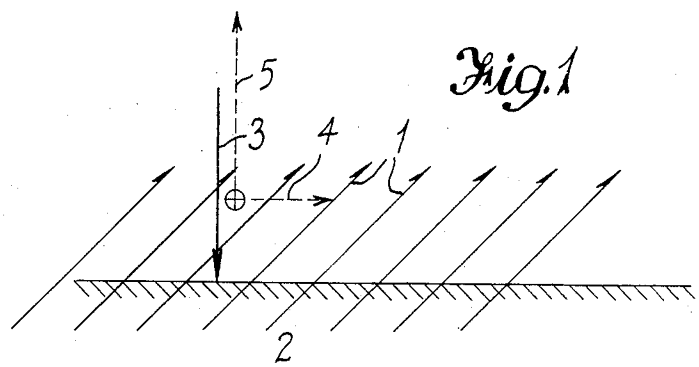
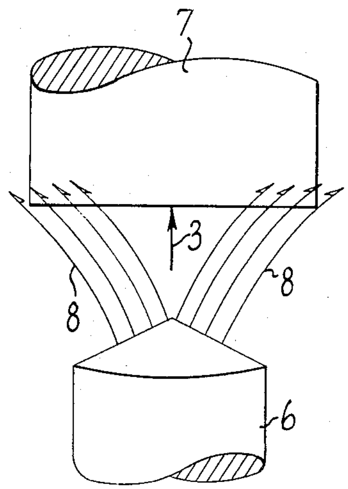
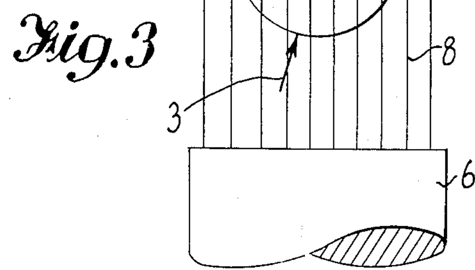
INVENTOR
HAROLD WROE
BY Larson and Taylor
ATTORNEYS STABILISATION OF LOW PRESSURE D.C. ARC DISCHARGES
Filed May 20, 1958 3 Sheets-Sheet 2
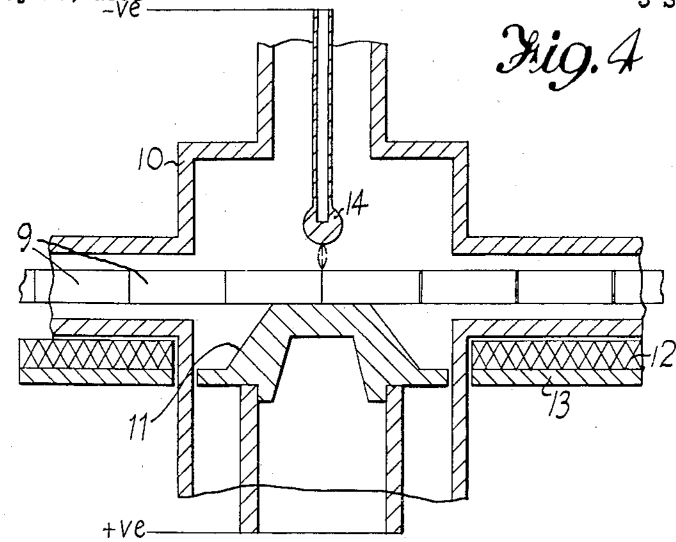
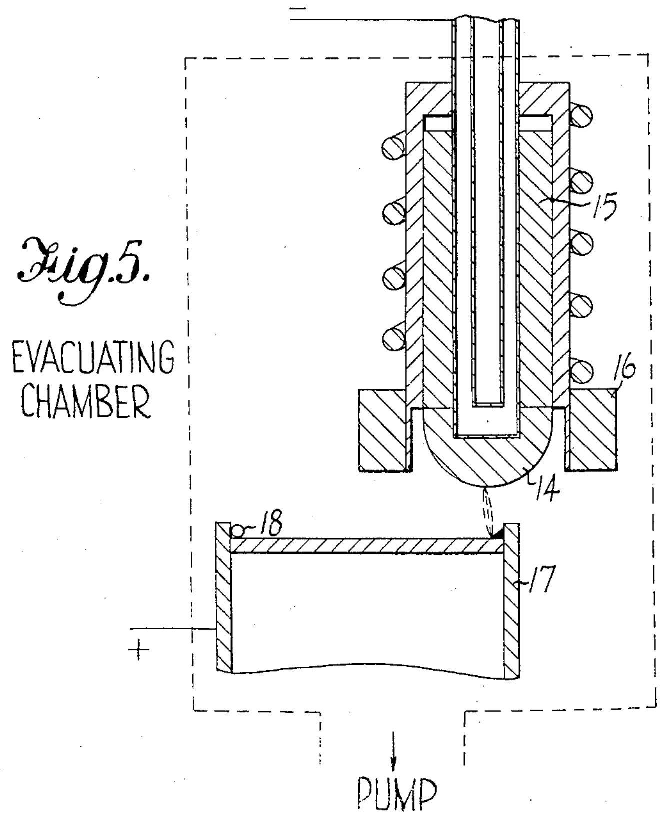
INVENTOR
HAROLD WROE
BY Lawson and Taylor
ATTORNEYS Feb. 21, 1961 H. WROE 2,972,695
STABILISATION OF LOW PRESSURE D.C. ARC DISCHARGES
Filed May 20, 1958 3 Sheets-Sheet 3
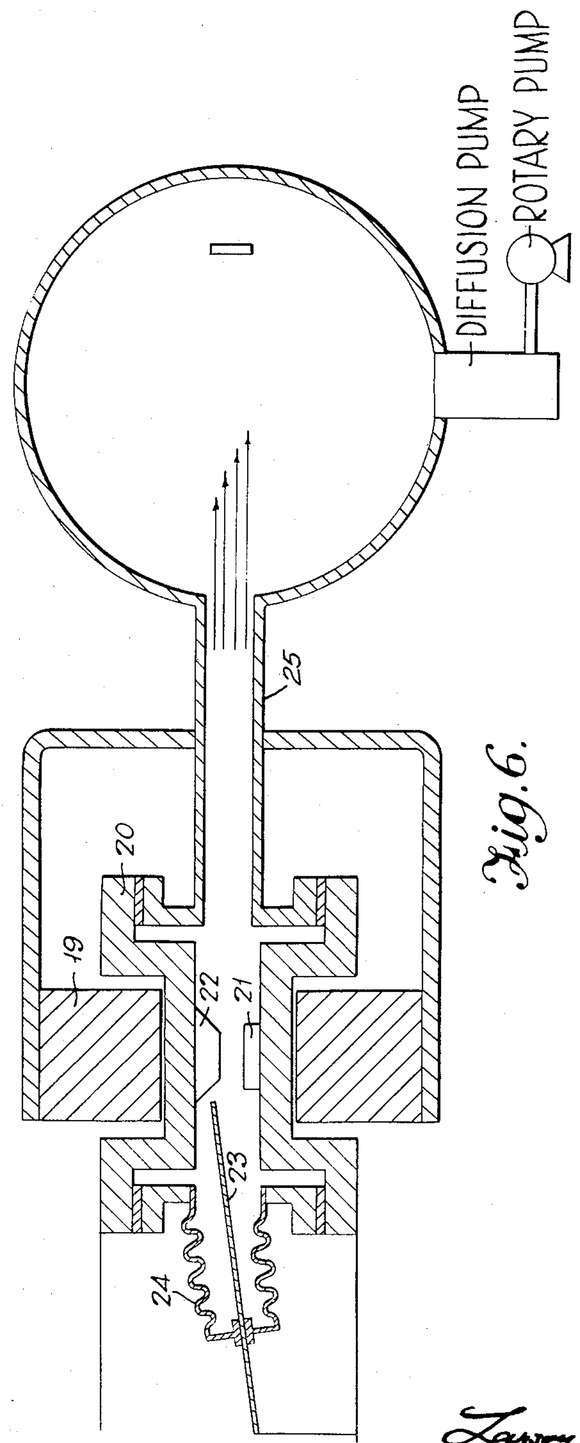
INVENTOR
HAROLD WROE
BY Lawrence and Taylor
ATTORNEYS United States Patent Office 2,972,695

Patented Feb. 21, 1961

2,972,695

STABILISATION OF LOW PRESSURE D.C. ARC DISCHARGES

Harold Wroe, Burnage, Manchester, England, assignor to Metropolitan-Vickers Electrical Company Limited, London, England, a British company Filed May 20, 1958, Ser. No. 736,568

Claims priority, application Great Britain May 24, 1957

4 Claims. (Cl. 313—157)

This invention relates to the stabilisation of a D.C. arc discharge in an ionizable medium at low pressure utilised for the melting, welding or evaporation of metals.

The invention is particularly, although not exclusively, concerned with the treatment of metal, such as zirconium, titanium, the production of solid masses or ingots of which, in a sigh state of purity is not possible by a conventional melting and casting process. The fundamental difficulties arise, in connection with such metals, owing to the lack of a suitable high temperature refractory material for containing the molten metal, the attainment of the high temperatures required to melt these metals, and the high reactivity of the metals at these high temperatures.

Similar shortcomings are also found in welding and evaporating such metals. It is, for example, possible to weld zirconium using tungsten electrodes in an inert atmosphere; and evaporation may be done from an induction-heated, refractory crucible. In both these methods the metal is liable to become contaminated.

The best method to melt and/or evaporate these metals is to use a low pressure arc discharge employing a consumable electrode of the metal to be melted. In the process the metal to be melted is initially in the form of a rod which may be made by powder-metallurgy techniques and is located in a chamber either under vacuum or filled with an inert gas. The rod is connected to a source of current and is fed down centrally inside a water-cooled copper mould or hearth at the base of which is a small amount of similar material forming the other electrode; when the two are brought into contact a depositing arc is initiated and the rod material melts off, forming a pool of molten metal which eventually extends to the wall of the hearth. Owing to the high thermal conductivity of the copper and the rapid heat extraction, the molten metal freezes rapidly as it comes into contact with the copper, thus forming an ingot of the metal, and no melting of the copper takes place. As more metal is added to the pool, progressive solidification takes place from the bottom and sides of the melt, so that at any instant only a small crescent-shaped pool of metal is molten.

A difficulty encountered in the arc discharge during operation of such a process arises from the tendency of the cathode spot to wander from the pool of molten metal on to the walls of the hearth; when this occurs the spot occasionally stops tracking and becomes fixed. Local melting of the water-cooled copper is likely to occur and the molten metal being treated flows into the resulting crater, producing mechanical locking which impedes ingot removal. There is a greater tendency for the root of the arc to wander when the consumable electrode is the positive electrode than when it is the negative electrode.

The main object of the invention is to effect stabilisation of the arc so that the motion of its root is confined to a selected area of the negative electrode.

According to the invention, the wandering of the arc root in a D.C. arc discharge between electrodes immersed in an ionizable medium at low pressure is restricted by means of a magnetic field symmetrical with respect to the direct path of the arc current flow to the cathode from the anode and having a component parallel with that current.

The magnetic field may be symmetrical with, and inclined to the normal direct path of the arc between the cathode and the anode so as to possess a component parallel with the axis of the normal path of the arc, and a component at right angles thereto. Such a field may be produced by a conical magnet pole having its apex directed towards the plane surfaces of the cathode. If the anode is of magnetic material, it may be shaped with a conical tip and magnetised by a coil located outside the chamber in which the discharge takes place. Alternatively, a magnetic field symmetrically located with respect to, and parallel with, the direct path of the arc between the cathode and the anode may be produced, and the cathode may be shaped with a spherical surface, so that wandering of the arc from the direct path results in an inclination of the field to the axis of the arc. A component of the field is then present which acts to restrain such wandering.

The invention may best be understood by reference to the accompanying drawings in which—

Fig. 1 shows the effect of a magnetic field on the motion of a cathode arc spot;

Fig. 2 illustrates the means by which cathode spot control on a plane cathode may be effected by an inclined magnetic field;

Fig. 3 illustrates the means by which cathode spot control on a shaped cathode may be effected by a uniform magnetic field;

Fig. 4 shows an application of magnetic stabilisation to vacuum welding;

Fig. 5 indicates an electrode arrangement for welding mild steel by means of a stabilising magnetic field produced by permanent magnets, and Fig. 6 illustrates a device for utilising a magnetically stabilised D.C. arc as a vapour source for vacuum deposition.

Referring to Fig. 1, this illustrates the action of a uniform magnetic field inclined at an angle to a cathode surface 2 on which an arc is rooted. The current of the arc 3 entering the cathode by the arc spot, has a high current density and the arc behaves like a current-carrying conductor and is deflected by the magnetic field but in the opposite direction to that defined by the left-hand rule. Thus the spot is moved into the plane of the paper by the component 4 of the field which is parallel to the cathode surface. A second effect also occurs due to the vertical component 5 of the fields, this being a movement of the cathode spot from an obtuse to an acute angle between the field and the surface, i.e. from left to right in Fig. 1. The direction of the field does not affect this motion, only its magnitude and angle of inclination.

The invention accordingly utilises this effect of the magnetic field on the position of the arc to provide cathode spot control. Field strengths of about 500 gauss are required at inclinations between about 20° to 50° to the cathode surface depending upon practical considerations.

In Fig. 2 a conical magnetic pole piece 6, energised by a coil outside the vacuum chamber in which the arc is produced is placed near the plane cathode 7. The pole piece may be the anode itself if the material to be melted is magnetic, or alternatively, if the material is non-magnetic, the anode may be interposed between a separate pole piece and the cathode. The shape of the field 8 is thus as indicated and the inclination to the cathode surface is obtained symmetrically with respect to the axis of the system, i.e. to the direct, or shortest, arc path between the electrodes. Thus the axial component of the magnetic field tends to push the cathode spot towards the direct path or axis of the arc current between cathode and anode and the radial component tends to move the spot round a circular track. The result is thus that the motion of the spot is restrained and confined to a small area at the centre of the electrode.

In Fig. 3 an alternative method is shown of producing a similar result. The inclination between the field and the cathode surface is obtained by the use of a suitably shaped electrode and a coaxial, uniform magnetic field. The electrode profile can be conical or spherical. With such shapes, the normals to the surface of the cathode are inclined with respect to the field except in the shortest path of arc current flow between the electrodes. The advantage of the spherical form is that the cathode may be tilted, e.g. to manipulate the electrode as in welding, the correct angle between the field and the cathode surface thus being automatically maintained. This method also has the advantage that the positive column of the arc is in a uniform magnetic field which causes it to be constricted to the form of a narrow cylinder instead of filling the whole evacuated chamber in which the arc takes place. As a consequence, during welding, the heating effect at the anode 6 is much more concentrated. In a melting arc-furnace, this effect enables a much higher vacuum to be used with lower current. Without this coaxial magnetic field it is impossible to get reasonable arc stability with currents less than 900 amp. In high vacuum without the magnetic field most of the heating effect is lost to the walls of the apparatus due to the spread of the positive column.

This method, however, cannot be used in cases where a consumable cathode is used. This arises from the fact that, if the cathode is allowed to melt, many small globules of molten metal are ejected from the cathode spot region at high speed and the stabilisation may sometimes break down due to the globules striking other parts of the cathode and initiating a new cathode spot. For this reason, in welding, a separate filler rod must be used and the cathode must be water-cooled.

The arrangement of Fig. 3 can be adapted for vacuum welding as indicated in Fig. 4. Short bars 9 that are to be welded together are fed end to end through the vacuum chamber 10 and over a steel hearth 11. This hearth is constituted by a magnetic pole-piece which is energised by a water-cooled coil 12 placed outside the vacuum chamber. A steel ring 13 is shown under the coil to improve the magnetic circuit. The arc occurs, as shown, between the bars 9 and the spherical electrode 14, both being of the same material. The field emanating from the pole piece has a component parallel to the arc path from electrode 14 to the bars 9 and components radially outwardly symmetrical with respect to the arc path. The electrode 14 is water-cooled and under the action of the arc the bars fuse together. The bars then move along until the next weld site is beneath the cathode and the arc again struck. Field strengths of about 500 gauss are required at the surface of the cathode.

A development of the system shown in Fig. 4 can be used for the welding of more complex objects. In nuclear processes it is sometimes necessary to encapsulate beryllium in an evacuated steel canister. This can be accomplished as shown in Fig. 5. In this embodiment the magnetic field as shown is produced by permanent magnets 15 placed inside the vacuum chamber and carried with the cathode 14. This arrangement is cheap and simple and produces the magnetic field only where it is required. An additional ring magnet 16 can act as a guard ring to preserve the correct field shape. The material to produce the fillet weld at the rim of the can 17 indicated may be in the form of a ring 18 of metal placed on the weld site, the ring melting under the arc and fusing with the can and the lid to make the weld. The welding takes place in the evacuating chamber indicated.

A device suitable for the evaporation of metals is shown in Fig. 6. In this instance the uniform magnetic field is produced by a permanent magnet system 19, placed outside the vacuum chamber 20. The electrodes 21, 22 are both made from the material to be evaporated and are water-cooled. The cathode 22 may have the conical shape shown but may be spherical. Since the electrodes are fixed, the arc is initiated by touching the cathode with a tungsten wire 23, which is electrically connected to the anode and manipulated through the bellows 24. Vapour from the discharge region migrates through a conduit in the form of a side tube 25 into the deposition chamber which is evacuated by a diffusion pump backed up by a rotary pump.

What I claim is:

1. An electric arc discharge system comprising electrodes for producing an arc discharge when a source of direct voltage is applied between said electrodes, one of said electrodes being constituted of a metal meltable by said arc, an evacuable chamber for confining the space between said electrodes, means for continuously evacuating said chamber, and means for producing in the arc path between said electrodes a magnetic field parallel with the direct path of arc current flow between said electrodes, the end of one of said electrodes being of such shape that the normals to the surface thereof are inclined with respect to said field except in the shortest path of arc current flow between said electrodes whereby an arc rooted on said electrode except in said shortest path of arc current experiences a component of said field tending to restore said arc to the shortest path.

2. An electric arc discharge system as claimed in claim 1, in which the end of said arc electrode is of spherical shape.

3. An electric arc discharge system as claimed in claim 1 in which the end of said arc electrode is of conical shape.

4. An electric arc discharge system comprising an evacuable chamber, electrodes in said chamber for producing an arc discharge when a source of direct voltage is applied between said electrodes, said electrodes being of a material to be vaporised by the action of said arc discharge, means for cooling said electrodes, means for producing a magnetic field axially of the path of the discharge between said electrodes, one of said electrodes being so shaped that movement of said arc from the shortest path between said electrodes causes said arc to experience a component of said field tending to restore said arc to the shortest path, movable electrode means for initiating an arc discharge between said electrodes, and conduit means for leading from said chamber vaporised electrode material produced by the action of said arc discharge.

References Cited in the file of this patent

UNITED STATES PATENTS

| | | |
|---|---|---|
| 1,427,753 | Budd et al. | Aug. 29, 1922 |
| 1,711,151 | Lincoln | Apr. 30, 1929 |
| 1,854,536 | Wilson | Apr. 19, 1932 |
| 2,475,183 | Gibson | July 5, 1949 |
| 2,897,539 | McMillan | Aug. 4, 1959 |